United States Patent
Zhang et al.

(10) Patent No.: US 7,075,758 B2
(45) Date of Patent: Jul. 11, 2006

(54) SUPPLEMENTARY SHIELD FOR CPP GMR READ HEAD

(75) Inventors: Kunliang Zhang, Fremont, CA (US); Kochan Ju, Monte Sereno, CA (US); Min Li, Fremont, CA (US); Youfeng Zheng, San Jose, CA (US); Simon Liao, Fremont, CA (US); Yue Liu, Fremont, CA (US)

(73) Assignee: Headway Technologies, Inc., Milpitas, CA (US)

(*) Notice: Subject to any disclaimer, the term of this patent is extended or adjusted under 35 U.S.C. 154(b) by 430 days.

(21) Appl. No.: 10/657,504

(22) Filed: Sep. 8, 2003

(65) Prior Publication Data
US 2005/0052789 A1     Mar. 10, 2005

(51) Int. Cl.
*G11B 5/39*     (2006.01)
(52) U.S. Cl. .................................................. 360/319
(58) Field of Classification Search ............. 360/319
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 6,496,334 B1 | 12/2002 | Pang et al. | 360/319 |
| 6,512,660 B1 | 1/2003 | Li et al. | 360/324 |
| 6,563,679 B1 | 5/2003 | Li et al. | 360/324 |
| 6,735,058 B1 * | 5/2004 | Lin et al. | 360/319 |
| 6,765,768 B1 * | 7/2004 | Saito | 360/319 |

* cited by examiner

*Primary Examiner*—A. J. Heinz
(74) *Attorney, Agent, or Firm*—Saile Ackerman LLC; Stephen B. Ackerman

(57) ABSTRACT

Increases in the AP1 and AP2 thickness cause the free layer to be off-center in a CPP magnetic read head. This problem has been overcome by inserting supplementary magnetic shields within the spin valve, located as close as possible to the stack. These supplementary shields enable the read gap width to be reduced by about 430 Å and the free layer to shift back towards the center by about 30 Å.

28 Claims, 5 Drawing Sheets

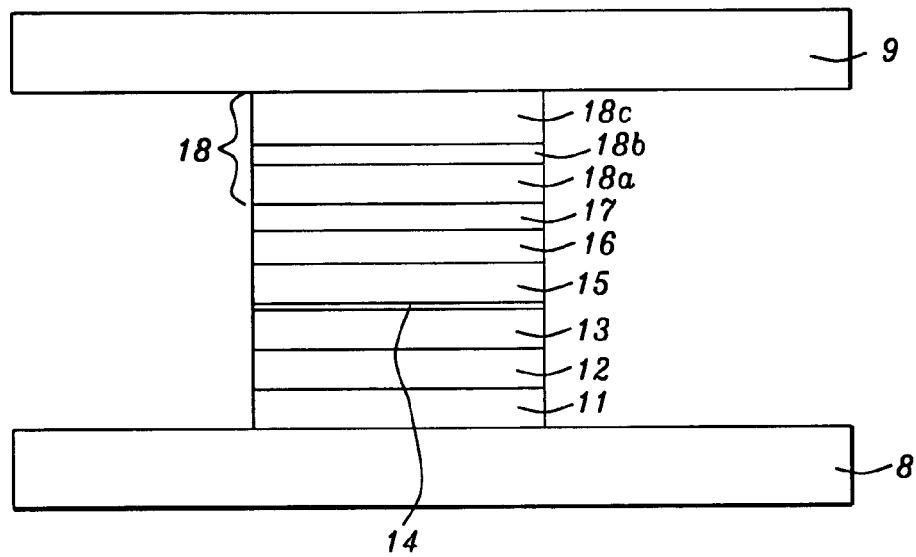
FIG. 1 – Prior Art
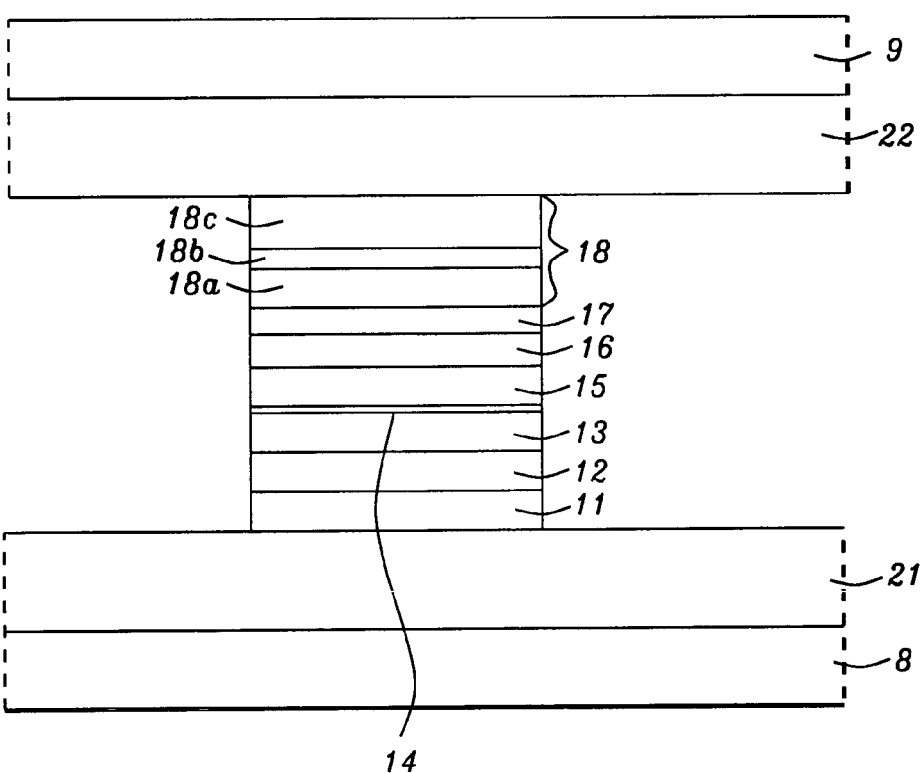
FIG. 2

NiFe100/Ru20

NiFe200/Cu20

SUPPLEMENTARY SHIELD FOR CPP GMR READ HEAD

FIELD OF THE INVENTION

The invention relates to the general field of CPP GMR read heads with particular reference to reducing the read gap width and to improving centralization of the free layer within the gap.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 on which is antiferromagnetic layer 12 whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1).

Next is a copper spacer layer 16 on which is low coercivity (free) ferromagnetic layer 17. Capping layer 18 (a laminate of three layers 18a, 18b, and 18c which are typically Cu, Ru, and Au respectively) lies atop free layer 17. When free layer 17 is exposed to an external magnetic field, the direction of its magnetization is free to rotate according to the direction of the external field. After the external field is removed, the magnetization of the free layer will be at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Also seen in FIG. 1 are the two magnetic shields 8 and 9 (S1 and S2) which are typically each about 2 microns thick.

Most GMR devices have been designed so as to measure the resistance of the free layer for current flowing parallel to its two surfaces (CIP). However, as the quest for ever greater densities has progressed, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible. In contrast, in a CPP device, the total transverse resistance of all layers, other than the free layer, should be as low as possible so that resistance changes in the free layer can dominate.

A related device to the CPP GMR described above is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ in magnetic read sensors is the change of resistivity of the tunnel junction between two ferromagnetic layers when it is subjected to a bit field from magnetic media. When the magnetizations of the pinned and free layers are in opposite directions, the tunneling resistance increases due to a reduction in the tunneling probability. The change of resistance is typically 40%, which is much larger than for GMR devices.

Since the free layer thickness is limited (typically about 30 Å), the AP1 layer has to be thicker for a higher CPP GMR. As a result, AP2 must also be thicker because its magnetic moment has to match that of AP1 for effective pinning to occur. A typical sample configuration might be as follows:

(S1)/Ta5/NiCr50/IrMn70/FeCo10/CoFe50/Ru4/
FeCo60/Cu30/CoFe30/cap/(S2)

where S1 and S2 are bottom and top magnetic shields, respectively and the various thicknesses associated with each layer are in Angstroms.

Because of the increase of the AP1 and AP2 thicknesses, the free layer gets shifted further away from the center of the read gap, an undesirable situation.

For better power dissipation, thermoelectric cooling (TEC) leads 21 and 22 may be inserted on top of the bottom shield and below the top shield, respectively, as shown in FIG. 2. This causes the read gap to be further widened, another undesirable situation.

A key feature of the present invention is a method to reduce the gap width as well as to shift the free layer closer to the center of the read gap.

A routine search of the prior art was performed with the following references of interest being found:

In U.S. Pat. No. 5,668,688 Dykes et al. describe NiFe shield layers and in U.S. Pat. No. 6,563,679 Li et al disclose a structure that we describe above. Li et al. teach a metal pillar carrying sense current connected to the top or bottom shield, in U.S. Pat. No. 6,512,660 while Pang et al. shows an extra shield for a sensor element in U.S. Pat. No. 6,496,334. Also of interest is M. Lederman et al (U.S. Pat. No. 5,627,704).

SUMMARY OF THE INVENTION

It has been an object of at least one embodiment of the present invention to provide a CPP GMR magnetic read head have a reduced read gap thickness.

Another object of at least one embodiment of the present invention has been to provide a read head in which the free layer is shifted back closer to the center of the read gap.

Still another object of at least one embodiment of the present invention has been that said read head include thermoelectric cooling leads.

A further object of at least one embodiment of the present invention has been to provide a process for manufacturing said read head.

These objects have been achieved by inserting top and bottom supplementary magnetic shields, between about 50 and 300 Angstroms thick, within the spin valve located as close as possible to stack. For example, between the stack and top and bottom thermoelectric cooling leads. These supplementary shields allow the read gap width to be reduced and the free layer to shift back closer to the center of the gap. A process for manufacturing the device is also disclosed.

BRIEF DESCRIPTION OF THE DRAWINGS

FIG. 1 shows a GMR stack of the prior art including top and bottom magnetic shields.

FIG. 2 is the structure seen in FIG. 1 with the addition of a pair of TEC (thermo-electric cooling) leads.

DESCRIPTION OF THE PREFERRED EMBODIMENTS

The heart of the present invention is the insertion of additional thin film shields in the structure seen in FIG. 2. These supplementary shields are much thinner than the standard S1 and S2 shields and they are located as close to the spin valve stack as possible.

We will now disclose the present invention in greater detail through a description of a process for manufacturing a bottom spin valve. This description will also serve to make clear the structure of the present invention. It will be readily understood by those skilled in the art that application of these ideas to the manufacture of top spin valve designs and dual spin valve designs follow along similar lines.

Figure 3:
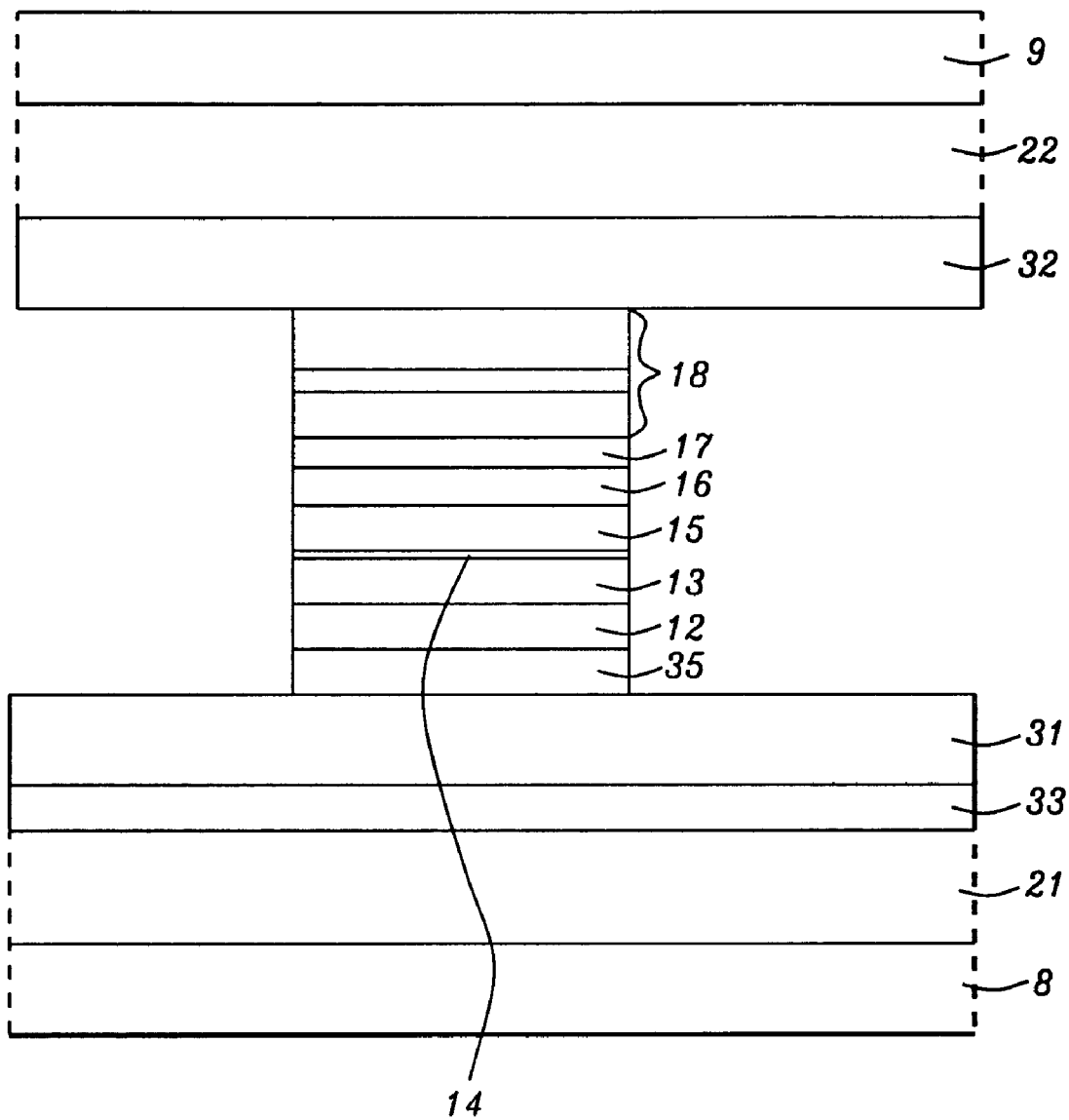
FIG. 3 shows how the structure seen in FIG. 2 may be modified, according to the present invention, to obtain a reduced gap width and improved centralization of the free layer, without sacrifice of key GMR properties.
Figure 4A:
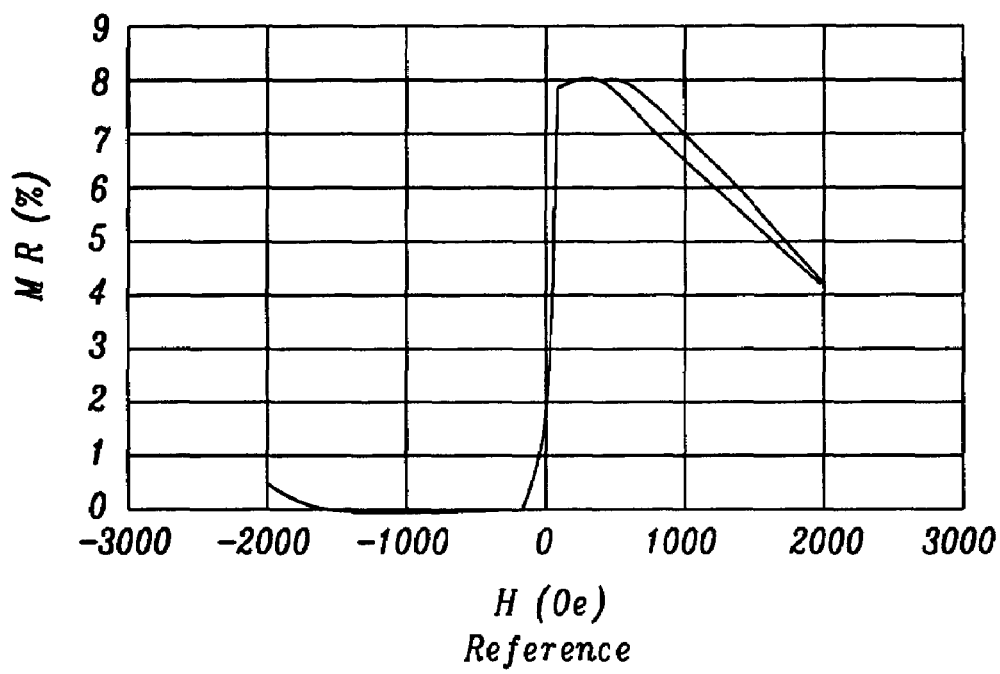
FIGS. 4a through 4d are R-H curves for a reference sample and three samples that include the features illustrated in FIG. 3.
Figure 4B:
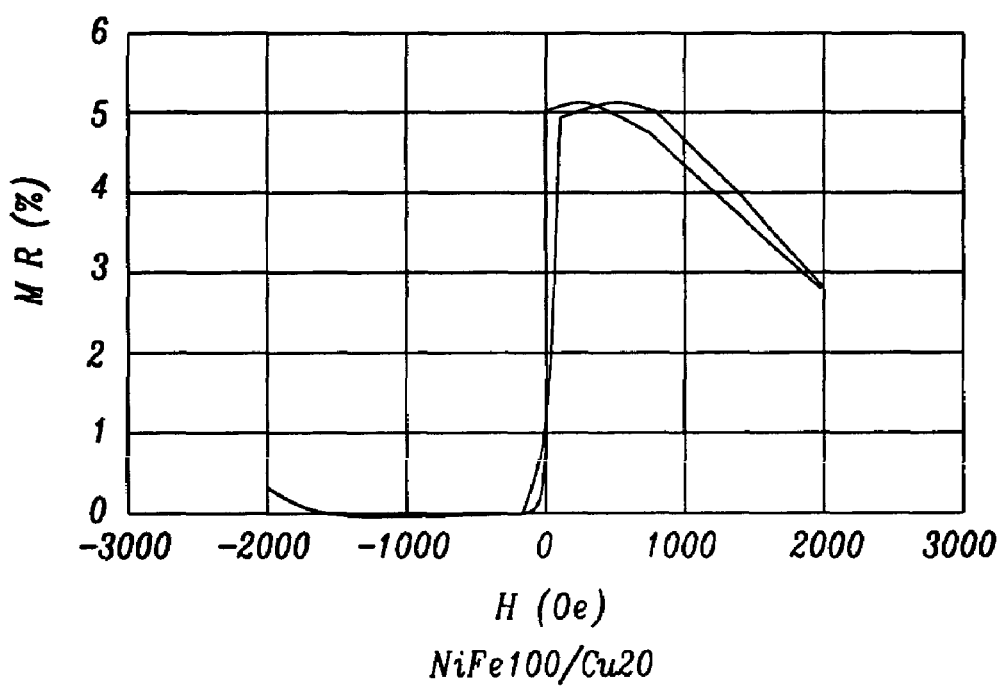
Figure 4C:
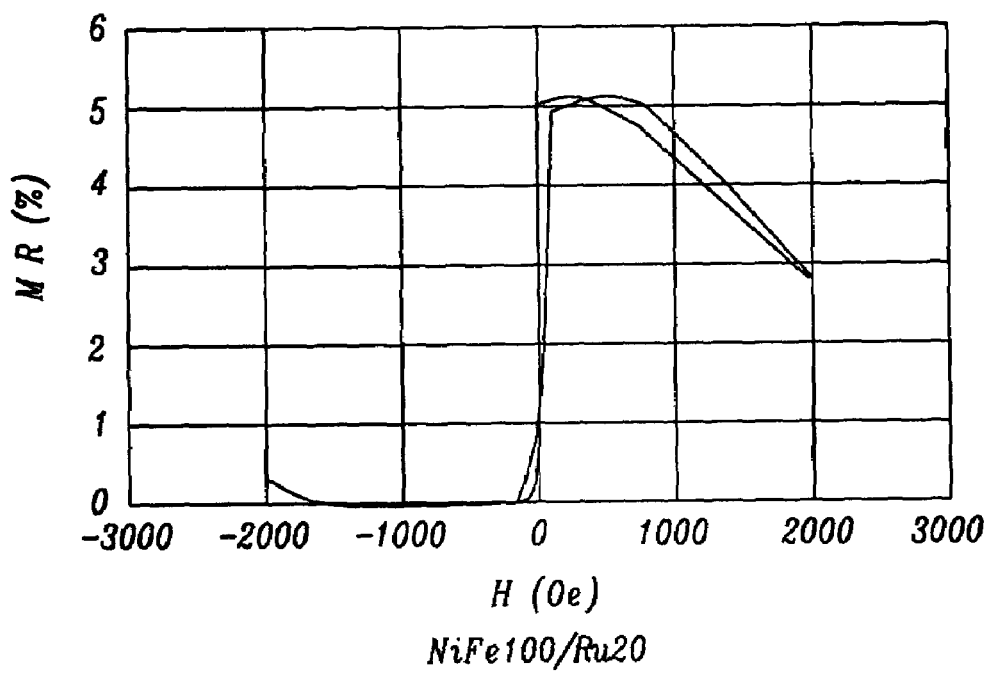
Figure 4D:
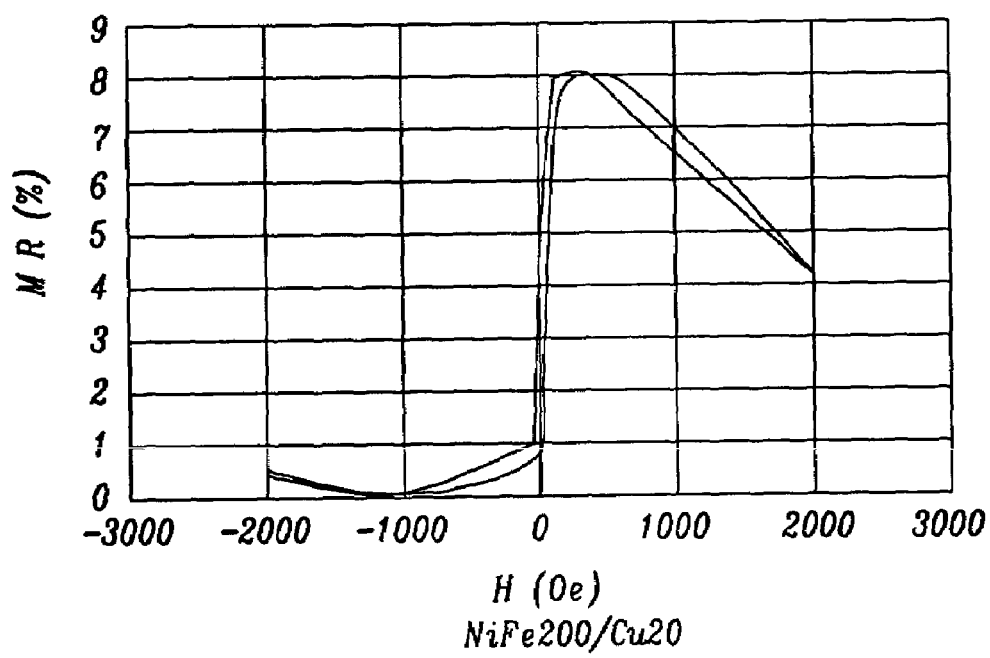

Referring now to FIG. 3, the process of the present invention begins with depositing a bottom magnetic shield layer 8 on a substrate (not shown) followed by the deposition of bottom TEC lead layer 21. Next is the deposition of seed layer 33 on bottom TEC lead layer 21.

A key feature of the invention now follows, namely deposition of bottom supplementary magnetic shield layer 31 on seed layer 33 to a thickness that is typically between about 50 and 300 Angstroms. Also important is the deposition of magnetic decoupling layer 35 on bottom supplementary magnetic shield layer 31. Suitable materials for magnetic decoupling layer 35 include (but are not limited to) Cu Ru Rh, and NiCu and it is deposited to a thickness between about 20 and 30 Angstroms.

Top supplementary magnetic shield layer 32 (between about 50 and 300 Angstroms thick) is then deposited on capping layer 18 which will also serve as a decoupling layer in the same way as layer 35 serves with respect to supplementary shield layer 31 and the process is concluded with the deposition of top TEC lead layer 22 and top magnetic shield layer 9. Suitable materials for the two supplementary shield layers include (but are not limited to) NiFe, CoFe, CoNiFe, and CoNbZr.

Confirmatory Results

Figure 5:
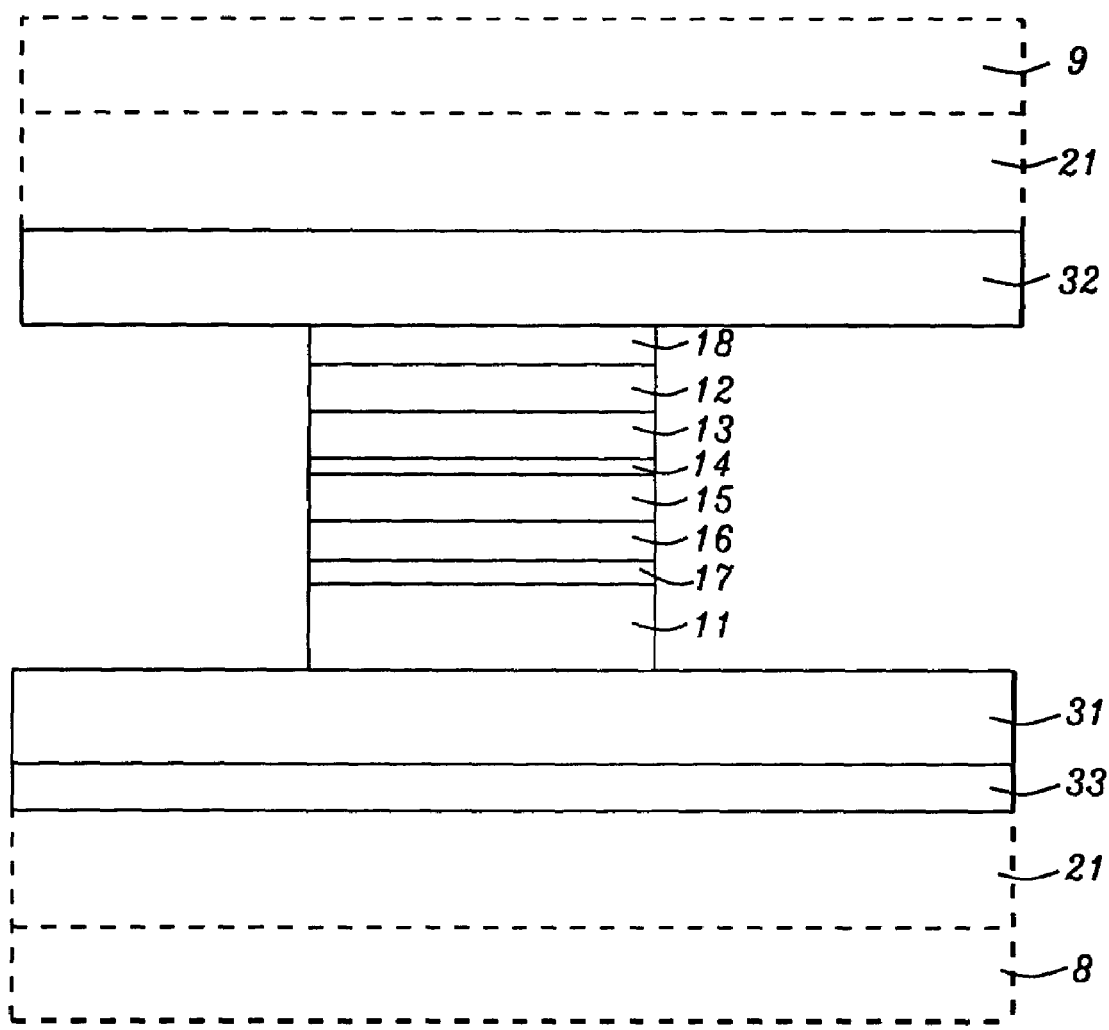
FIG. 5 shows the application of the invention to a top spin valve CPP read head.

We have used a CIP (current in plane) bottom spin valve design to demonstrate the effectiveness of the present invention but similar results would be expected from a top spin valve and/or a CPP structure. See FIG. 5 for an illustration of the incorporation of the invention as part of a top spin valve CPP read head.

The composition of our reference sample was as follows:

Ta5/NiCr50/NiFe(t)/IrMn70/FeCo10/CoFe50/Ru4/
FeCo60/Cu30/CoFe30/Ru5/Ta20

The test sample compositions were as follows:

Ta5/NiCr50/NiFe(t)/DL/IrMn70/FeCo10/CoFe50/
Ru4/FeCo60/Cu30/CoFe30/Ru5/Ta20 where NiFe(t) means a NiFe supplementary shield of thickness t and DL means a decoupling layer (of Cu or Ru). All thicknesses are in Angstroms.

The results are summarized in TABLE I immediately below:

| Sample | MR (%) | R (Ω) | ΔR (Ω) | Hua (Oe) | dMR | Hin (Oe) | Hcf (Oe) | Hk (Oe) |
|---|---|---|---|---|---|---|---|---|
| reference | 8.19 | 1.98 | 0.162 | ~2000 | 0.51 | 31.92 | 19.20 | 16.19 |
| NiFe100/Cu20 | 5.24 | 1.41 | 0.073 | ~2000 | 0.54 | 56.08 | 19.29 | 20.90 |
| NiFe100/Ru20 | 5.39 | 1.48 | 0.080 | ~2000 | 0.51 | 53.87 | 17.51 | 22.49 |
| NiFe200/Cu20 | 3.68 | 1.04 | 0.038 | ~2000 | 0.56 | 46.48 | 20.10 | 22.76 |

TABLE I shows the CIP results while FIGS. 4a through 4d show the corresponding R-H curves. This data demonstrates that good pinning properties can be achieved by the addition of a supplementary magnetic shield.

As for decoupling efficiency, the exchange bias field for NiFe200/Cu20/IrMn70 is estimated to be around 5 Oe. The coupling strength between the supplementary shield and the AFM layer can be even further reduced if we increase the decoupling layer thickness and/or the supplementary shield thickness. For example, If the thickness of a NiFe supplementary shield is 300 Å, then 10 Å Cu will be adequate to serve as a decoupling layer.

Assuming a thickness for both top and bottom TEC leads of 200 Å and a seed layer thickness of 60 Å, the application of the supplementary shields (together with a 30 Å decoupling layer), allows the read gap width to be reduced by 430 Å (a significant amount) and the free layer to shift back towards the center by 30 Å.

We conclude by noting that the magnetic properties of thin films are known to be very sensitive to a number of factors in addition to their composition. Said factors include, but may not be limited to, thickness, deposition conditions, annealing treatments (particularly in the presence of a magnetic field), immediate underlayer, and immediate overcoating. Thus, as a general rule, the parameters that characterize the layers named in the claims to be recited below should be regarded as critical rather than merely optimal.

What is claimed is:

1. A method to reduce read gap width in a CPP spin valve, having top and bottom TEC leads, comprising:
    providing top and bottom magnetic shields that are located above and below said top and bottom TEC leads respectively;
    inserting top and bottom supplementary magnetic shields, between about 50 and 300 Angstroms thick, between the spin valve and said top and bottom TEC leads respectively; and
    inserting top and bottom magnetic decoupling layers between the spin valve and said top and bottom supplementary magnetic shields.

2. The method of claim 1 wherein the read gap width is about 430 Å less and the free layer is closer to the center by about 30 Å, relative to said spin valve when lacking said supplementary magnetic shields.

3. The method of claim 1 wherein said bottom spin valve has a total thickness, including said top and bottom magnetic shields, of between about 2 and 6 microns and a read gap width that is less than about 0.07 microns.

4. The method of claim 1 wherein said bottom magnetic decoupling layer is Cu, Ru, Rh, or NiCu.

5. The method of claim 1 wherein said bottom magnetic decoupling layer is between about 10 and 50 Angstroms thick.

6. The method of claim 1 wherein said top magnetic decoupling layer also serves as a capping layer for said spin valve.

7. A CPP spin valve, having top and bottom TEC leads and a read gap, comprising:
- top and bottom magnetic shields that are located above and below said top and bottom TEC leads respectively;
- top and bottom supplementary magnetic shields, between about 50 and 300 Angstroms thick, between the spin valve and said top and bottom TEC leads respectively; and
- top and bottom magnetic decoupling layers between the spin valve and said top and bottom supplementary magnetic shields.

8. The spin valve of claim 7 further comprising a read gap whose width is about 430 Å less and a free layer that is more central by about 30 Å, relative to said spin valve when lacking said supplementary magnetic shields.

9. The CPP spin valve of claim 7 wherein said spin valve has a total thickness, including said top and bottom magnetic shields, of between about 2 and 6 microns and a read gap width that is less than about 0.07 microns.

10. The CPP spin valve of claim 7 wherein said bottom magnetic decoupling layer is Cu, Ru, Rh, or NiCu.

11. The CPP spin valve of claim 7 wherein said bottom magnetic decoupling layer is between about 10 and 50 Angstroms thick.

12. The CPP spin valve of claim 7 wherein said top magnetic decoupling layer also serves as a capping layer for said spin valve.

13. A process to manufacture a CPP GMR read head, having a write gap, comprising:
- depositing a bottom magnetic shield layer on a substrate;
- depositing a bottom TEC lead layer on said bottom magnetic shield layer;
- depositing a seed layer on said bottom TEC lead layer;
- depositing on said seed layer a bottom supplementary magnetic shield layer that is between about 50 and 300 Angstroms thick;
- depositing a magnetic decoupling layer on said bottom supplementary magnetic shield layer;
- forming a bottom spin valve, including a capping layer, on said magnetic decoupling layer;
- depositing on said capping layer a top supplementary magnetic shield layer that is between about 50 and 300 Angstroms thick;
- depositing a top TEC lead layer on said top supplementary magnetic shield layer; and
- depositing a top magnetic shield layer on said top TEC layer.

14. The process described in claim 13 wherein the step of forming a bottom spin valve further comprises:
- depositing an antiferromagnetic layer;
- depositing an AP2 layer on said antiferromagnetic layer;
- depositing an antiferromagnetic decoupling layer on said AP2 layer;
- depositing an AP1 layer on said antiferromagnetic coupling layer;
- depositing a copper spacer layer on said AP1 layer;
- depositing a free layer on said copper spacer layer;
- depositing said capping layer on said free layer; and
- causing said AP1 and AP2 layers to become magnetically anti-parallel to one another.

15. The process of claim 14 further comprising formation of a read gap whose width is about 430 Å less, and the free layer about 30 Å more central, relative to said spin valve lacking said supplementary magnetic shield.

16. The process described in claim 13 wherein said read gap is between about 300 and 700 Angstroms.

17. The process described in claim 13 wherein said magnetic decoupling layer is Cu, Ru, Rh, or NiCu.

18. The process described in claim 13 wherein said magnetic decoupling layer is deposited to a thickness between about 20 and 30 Angstroms.

19. The process described in claim 13 wherein said supplementary magnetic shields are NiFe, CoFe, CoNiFe, or CoNbZr.

20. The process described in claim 14 wherein the step of depositing a capping layer further comprises depositing, in succession with no intervening steps, layers of copper, ruthenium, and gold to a total thickness between about 30 and 60 Angstroms.

21. A CPP GMR read head, having a write gap, comprising:
- a bottom magnetic shield layer on a substrate;
- a bottom TEC lead layer on said bottom magnetic shield layer;
- a seed layer on said bottom TEC lead layer;
- on said seed layer a bottom supplementary magnetic shield layer that is between about 50 and 300 Angstroms thick;
- a magnetic decoupling layer on said bottom supplementary magnetic shield layer;
- a bottom spin valve, including a capping layer, on said magnetic decoupling layer;
- on said capping layer, a top supplementary magnetic shield layer that is between about 50 and 300 Angstroms thick;
- a top TEC lead layer on said top supplementary magnetic shield layer; and
- a top magnetic shield layer on said top TEC layer.

22. The read head described in claim 21 further comprising:
- an antiferromagnetic layer on said seed layer;
- an AP2 layer on said antiferromagnetic layer;
- an antiferromagnetic decoupling layer on said AP2 layer;
- an AP1 layer on said antiferromagnetic coupling layer;
- a copper spacer layer on said AP1 layer;
- a free layer on said copper spacer layer;
- the capping layer being on said free layer; and
- said AP1 and AP2 layers being magnetically anti-parallel to one another.

23. The read head of claim 22 further comprising a read gap whose width is about 430 Å less and a free layer that is more central by about 30 Å, relative to said read head when lacking said supplementary magnetic shield.

24. The read head described in claim 21 wherein said read gap is between about 300 and 700 Angstroms.

25. The read head described in claim 21 wherein said magnetic decoupling layer is Cu, Ru, Rh, or NiCu.

26. The read head described in claim 21 wherein said magnetic decoupling layer has a thickness between about 20 and 30 Angstroms.

27. The read head described in claim 21 wherein said supplementary magnetic shield is NiFe, CoFe, CoNiFe, or CoNbZr.

28. The read head described in claim 22 wherein the capping layer is a laminate of copper, ruthenium, and gold having a total thickness between about 30 and 60 Angstroms.

* * * * *